United States Patent
Berger et al.

(10) Patent No.: US 7,150,407 B1
(45) Date of Patent: Dec. 19, 2006

(54) SYSTEM FOR INTERCHANGING DATA BETWEEN AT LEAST TWO CONTACTLESS DATA STORAGE MEDIA

(75) Inventors: Dominik Berger, Graz (AT); Marc Melchior, Hohenkammer (DE)

(73) Assignee: Infineon Technologies AG, Munich (DE)

( * ) Notice: Subject to any disclaimer, the term of this patent is extended or adjusted under 35 U.S.C. 154(b) by 241 days.

(21) Appl. No.: 11/016,374

(22) Filed: Dec. 17, 2004

Related U.S. Application Data

(63) Continuation of application No. PCT/DE03/01641, filed on May 20, 2003.

(30) Foreign Application Priority Data

Jun. 20, 2002 (DE) ................. 102 27 558

(51) Int. Cl.
G06K 19/06 (2006.01)
(52) U.S. Cl. ................. 235/492; 235/379; 235/380
(58) Field of Classification Search ................. 235/379, 235/380, 492, 441, 487; 902/25, 26; 705/39, 705/44, 41; 361/737
See application file for complete search history.

(56) References Cited

U.S. PATENT DOCUMENTS

| | | | | |
|---|---|---|---|---|
| 4,593,273 A * | 6/1986 | Narcisse | ................. | 340/573.4 |
| 4,812,634 A * | 3/1989 | Ohta et al. | ................. | 235/492 |
| 4,843,224 A * | 6/1989 | Ohta et al. | ................. | 235/487 |
| 5,138,142 A * | 8/1992 | Sanemitsu | ................. | 235/492 |
| 5,396,218 A * | 3/1995 | Olah | ................. | 340/568.7 |
| 5,434,395 A * | 7/1995 | Storck et al. | ................. | 235/380 |
| 5,602,915 A * | 2/1997 | Campana et al. | ................. | 380/277 |
| 5,748,737 A | 5/1998 | Daggar | | |
| 5,774,876 A * | 6/1998 | Woolley et al. | ................. | 705/28 |
| 5,777,903 A * | 7/1998 | Piosenka et al. | ................. | 708/100 |
| 5,789,733 A * | 8/1998 | Jachimowicz et al. | ................. | 235/492 |
| 5,841,119 A * | 11/1998 | Rouyrre et al. | ................. | 235/380 |
| 5,978,655 A * | 11/1999 | Ohura et al. | ................. | 455/41.1 |
| 6,010,066 A * | 1/2000 | Itou et al. | ................. | 235/379 |
| 6,092,133 A * | 7/2000 | Erola et al. | ................. | 710/301 |
| 6,157,966 A * | 12/2000 | Montgomery et al. | ................. | 710/8 |
| 6,254,001 B1 * | 7/2001 | Chan | ................. | 235/380 |
| 6,336,591 B1 * | 1/2002 | Staples et al. | ................. | 235/487 |
| 6,394,343 B1 * | 5/2002 | Berg et al. | ................. | 235/379 |
| 6,425,522 B1 * | 7/2002 | Matsumoto et al. | ................. | 235/380 |
| 6,490,256 B1 * | 12/2002 | Jones et al. | ................. | 370/277 |
| 6,502,748 B1 * | 1/2003 | Berg et al. | ................. | 235/379 |
| 6,507,130 B1 * | 1/2003 | Thuringer et al. | ................. | 307/70 |
| 6,572,015 B1 * | 6/2003 | Norton | ................. | 235/382 |
| 6,611,819 B1 * | 8/2003 | Oneda | ................. | 705/41 |
| 6,616,054 B1 * | 9/2003 | Norton | ................. | 235/492 |
| 6,659,343 B1 * | 12/2003 | Tanaka | ................. | 235/380 |
| 2002/0014537 A1 * | 2/2002 | Obana et al. | ................. | 235/492 |
| 2002/0111918 A1 * | 8/2002 | Hoshino et al. | ................. | 705/65 |
| 2002/0130187 A1 * | 9/2002 | Berg et al. | ................. | 235/492 |
| 2003/0178483 A1 * | 9/2003 | Wakabayashi | ................. | 235/380 |
| 2004/0179545 A1 * | 9/2004 | Erola et al. | ................. | 370/449 |

(Continued)

FOREIGN PATENT DOCUMENTS

DE 691 04 198 T2 3/1995

(Continued)

*Primary Examiner*—Karl D. Frech
*Assistant Examiner*—Daniel Walsh
(74) *Attorney, Agent, or Firm*—Darby & Darby

(57) ABSTRACT

System for interchanging data between at least two contactless data storage media, particularly contactless chip cards, wherein at least one of the contactless data storage media controls the data interchange as a master, and the at least one other data storage medium is controlled as a slave.

13 Claims, 1 Drawing Sheet

U.S. PATENT DOCUMENTS

2005/0025117 A1* 2/2005 Inagaki et al. .............. 370/350
2005/0053095 A1* 3/2005 Kato et al. .................. 370/474
2005/0134459 A1* 6/2005 Glick et al. .............. 340/572.1

FOREIGN PATENT DOCUMENTS

| | | |
|---|---|---|
| DE | 100 00 995 A1 | 8/2000 |
| EP | 0 463 261 A1 | 1/1992 |
| EP | 0 662 674 A1 | 7/1995 |
| EP | 1 172 754 A1 | 1/2002 |
| JP | 361048082 * | 3/1986 |
| JP | 361048083 * | 3/1986 |
| WO | WO-99/01960 A2 | 1/1999 |

* cited by examiner

SYSTEM FOR INTERCHANGING DATA BETWEEN AT LEAST TWO CONTACTLESS DATA STORAGE MEDIA

CROSS-REFERENCE TO RELATED APPLICATION

This application is a continuation of International Patent Application Serial No. PCT/DE03/01641, filed May 20, 2003, which published in German on Dec. 31, 2003 as WO 2004/001657, and is incorporated herein by reference in its entirety.

FIELD OF THE INVENTION

The invention relates to a system for exchanging data between at least two contactless data storage media.

BACKGROUND OF THE INVENTION

Today, we are familiar with contactless chip cards or contactless SIM cards which allow contactless transmission of data between the data storage medium and associated read unit. These are frequently used for storing data. Normally, the power required for operating the data storage medium is also transmitted contactlessly by the read unit. In line with the power and data transmission methods used, contactless ID systems are referred to as RFID (Radio Frequency Identification) systems.

Power is supplied to the data storage medium and data interchange takes place between the data storage medium and the read unit using magnetic or electromagnetic fields.

A read/write unit typically contains a radio-frequency module (transmitter and receiver), a control unit and a coupling element for the electronic data storage medium.

Any communication between the data storage media themselves takes place via a read or write unit (transmitting and/or receiving station), which performs the master function in the communication.

Contactless data storage media always operate in slave mode and cannot communicate with one another directly.

Read and write operations on a contactless data storage medium are handled strictly according to the master/slave principle. All the activities of the read unit and of the data storage medium are initiated by the application software. In a hierarchic system structure, the application software is thus the master, while the read unit as the slave becomes active merely upon read/write commands from the application software. In order to execute a command from the application software, the read unit starts to set up communication with the data storage medium. In this context, the read unit is now the master for the data storage medium. The data storage medium thus responds exclusively to commands from the read unit and never becomes active autonomously.

The basic task of a read unit is thus to activate the data storage medium, to set up communication with the data storage medium and to transport the data between the application software and a contactless data storage medium. All the special features of contactless communication, that is to say connection setup, anticollision or authentication, are handled by the read unit alone.

Passive contactless data storage media are becoming increasingly widespread in many areas, particularly on the consumer market. Up until now, it has not been possible for two contactless data storage media to be able to interchange data directly without the use of a read/write unit.

SUMMARY OF THE INVENTION

The invention is therefore based on an object of providing a system, and a data storage medium which can be operated in this system, in which it is possible to interchange data between two contactless data storage media without the use of a read/write unit.

The fact that the functions such as receiving, forwarding, storing, processing and outputting data on the data storage medium operating as the master can be mapped thereon in terms of circuitry means that the data storage medium takes on the functions required for communication, such as connection setup, anticollision procedures, authentication, control and timing.

A further component is formed by the application software, which initiates all the activities of the data storage media among one another. The power source required for operating a data storage medium is provided either by means of an external power supply or by means of an internal power supply. The external power source used is either a conventional read/write unit or an external, magnetic-field generating module. Installing a battery, a storage battery or a solar cell on a data storage medium can provide an internal power supply. One great advantage is shown in this case in the flexibility of the opportunities for using contactless data storage media which allow data interchange without the use of a cost-intensive read/write unit. In this context, one possible embodiment is the internal power supply. As a further embodiment, magnetic-field generating modules can be fitted in mobile telephones and provide the power source for contactless data storage media. If a contactless data storage medium is equipped with an internal power supply, then it is possible to provide the power required for further operation of a contactless data storage medium. Another advantage of the internal power supply is that, as soon as the data storage medium is brought into the magnetic alternating field of the antenna on another data storage medium, it can change over to the external power supply, so that its own resources are not used up.

The data storage medium operating as a master can be put into slave mode at any time and responds to requests from a read/write unit or from another data storage medium, operating in master mode.

Data interchange among contactless data storage media allows the absolute dependency on read/write units to be eliminated, so that data interchange can proceed much more flexibly and without read/write units.

BRIEF DESCRIPTION OF THE DRAWINGS

The invention is explained in more detail below with reference to the drawings, in which.

DETAILED DESCRIPTION OF PREFERRED EMBODIMENTS OF THE INVENTION

Figure 1:
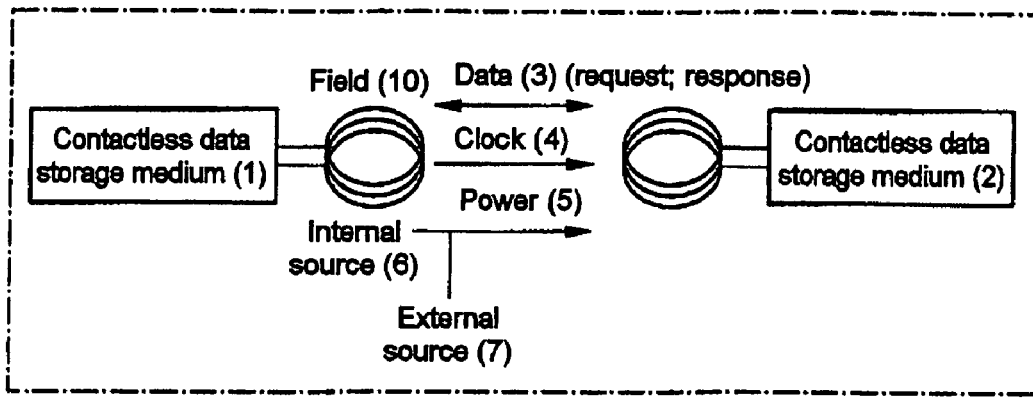
FIG. 1 shows an exemplary embodiment of the invention in a form of a block diagram.

FIG. 1 shows the data interchange between wireless data storage media in master/slave operation, where the contactless data storage medium 1 is operating as a master and has an internal power source 6 or can be supplied by means of an external power source 7. The data storage medium 2 is operating as a slave.

In this context, as with the method of inductive coupling, for example, the data storage medium 1 equipped with a power source 5 produces a strong radio-frequency, electromagnetic field 10 which passes through the cross section of the coil face and the space around the coil face. A small portion of the emitted field 10 passes through the antenna coil on the data storage medium 2, which is at some distance from the coil on the data storage medium 1 and produces a voltage on its coil by means of induction. If the data storage medium 2 is brought into the magnetic alternating field from the antenna on the data storage medium 1, then the latter draws power 5 from the magnetic field. By way of example, amplitude modulation methods can be used to transmit data 3 from data storage medium 2 to data storage medium 1.

The functions required for communication, such as a clock 4, can be controlled by the data storage medium 1, for example. In this communication environment, the two contactless data storage media, 1 and 2, can be changed over to master or slave mode at any time, depending on the application.

This allows bidirectional communication between the data storage media 1 and 2 such that the two data storage media can set up a communication environment in which they can communicate with one another alternately as master or slave.

Hence, a data query, generated by data storage medium 1 as master, to data storage medium 2 as slave can prompt data storage medium 2 to change over to master mode when this data query has been processed and likewise to request data from data storage medium 1 as a slave. In this context, the data storage medium 2 can draw the required power for the data query from an internal or external power source.

Figure 2:
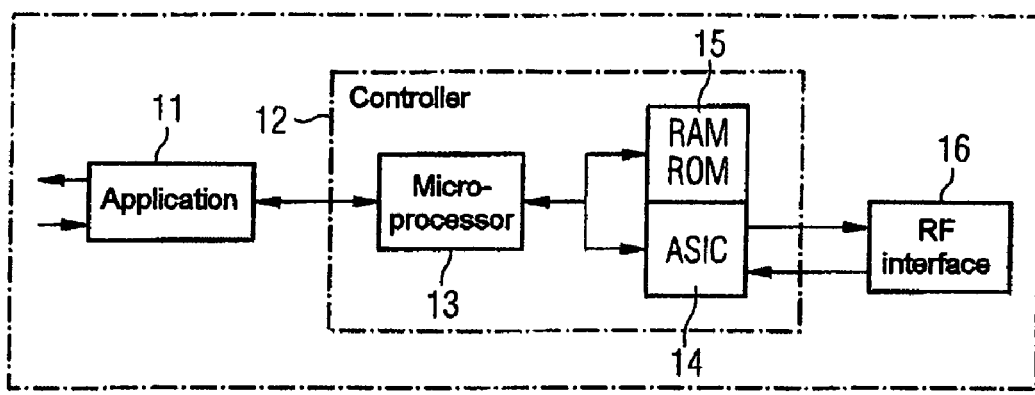
FIG. 2 shows a data storage medium in accordance with the invention.

FIG. 2 shows an embodiment of the data storage medium 1 more precisely.

This block diagram shows an example of the basic function blocks which a contactless storage medium 1 needs for performing its function as master. The overall system is controlled by means of a software application, the application 11, using control commands. The controller 12 communicates with the application software 11 and executes the latter's commands. In addition, it controls the communication sequence with another data storage medium 2, operating in slave mode, as shown in FIG. 1, for example, and is also responsible for signal coding and signal decoding. Additional functions such as execution of an anticollision algorithm, encryption and decryption of the data 3 which are to be transmitted between the data storage media and handling of an authentication operation are performed by a microprocessor 13 as a central component. Cryptic methods, such as encryption or signal coding, can be moved to an additional unit, such as an ASIC 14. RAM/ROM 15 are used as data/program stores.

The radio-frequency interface 16 essentially comprises a transmitter and a receiver. It is responsible for producing a radio-frequency transmission power for activating and supplying power to another data storage medium. In addition, it takes on the function of modulating the transmitted signal for transmitting data to another data storage medium and for receiving and demodulating RF signals coming from another data storage medium. The application 11 presents the downstream controller 12 with an inquiry which results in a request to the wireless data storage medium 2. During the break in transmission on the data storage medium 1 operating as master, the data storage medium 2 operating as slave transmits its data. On the data storage medium 1, the transmitter and receiver are therefore active at alternate times. If two data storage media operating as masters are linked together in a communication system, then they alternate in transmission or reception mode using delay-free changeover electronics according to the requirement. The application is comparable to a walky-talky.

Figure 3:
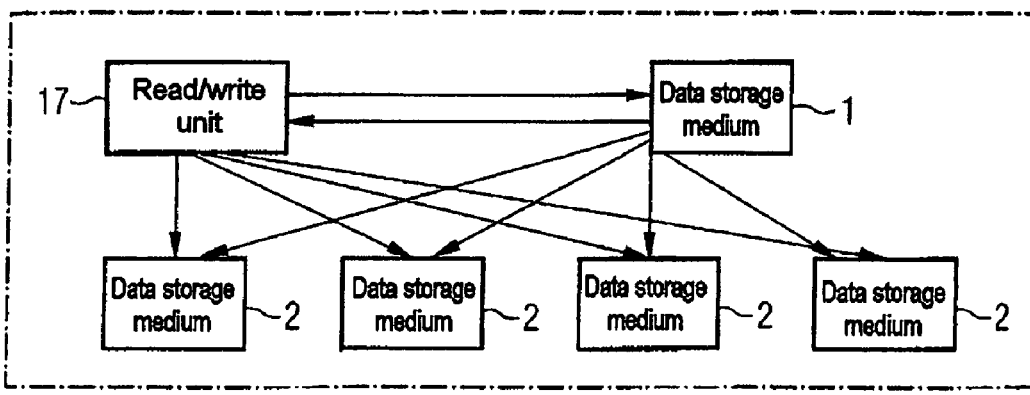
FIG. 3 shows an application of the inventive system.

FIG. 3 shows the operation of a system for interchanging data between at least two contactless data storage media, where at least one data storage medium is operating as a master and, in addition, a read/write unit and a plurality of contactless data storage media 2 operating as slaves are in the response range of the data storage medium 1 operating as a master.

If the data storage medium 1 operating as a master is put into the response range of a read/write unit and is asked to transmit data, it switches back to slave mode and carries out the request.

In addition, it can itself, operating as a master, request data 3 from the data storage media 2 operating as slaves.

In this context, the data storage medium 1 needs to use an anticollision procedure in order to ensure fault-free handling of this multiple access.

What is claimed is:

1. A system for interchanging data between at least two contactless data storage media, wherein at least one of the contactless data storage media cards controls the data interchange as a master, and the at least one other data storage media cards is controlled as a slave, and power required for operating at least one other data storage media card is provided by the data storage media card which controls the data interchange as the master.

2. The system as claimed in claim 1, wherein the data storage media card are mobile data storage media card.

3. The system as claimed in claim 1, wherein the data storage media card are contactless chip cards or SIM cards.

4. The system as claimed in claim 1, wherein the data storage media card have dimensions of a chip card or SIM card.

5. The system as claimed in claim 1, wherein a power source required for supplying power to the master data storage media card is provided by an external power supply.

6. The system as claimed in claim 1, wherein a power source required for supplying power to the master data storage media card is situated on the master data storage medium.

7. The system as claimed in claim 6, wherein the power source for the master data storage media card comprises a battery, a storage battery or a solar cell.

8. The system as claimed in claim 6, wherein the power source can be changed over to an external power supply.

9. The system as claimed in claim 1, wherein the data storage media card operating as a master can be put into slave mode.

10. The system as claimed in claim 1, wherein the data storage media card operating as a master receives, forwards, stores, processes and outputs data, and also performs connection setup, anticollision or authentication.

11. A mobile data storage media card having a transponder for contactless data transmission of data stored on the data storage media card, wherein an application performing a master function can be programmed on the data storage media card, and power required for operating at least one other data storage media card is provided by the data storage medium which controls the data transmission as a master.

12. A system for interchanging data between at least two contactless data storage media card, wherein at least one of the contactless data storage media card controls the data interchange as a master and the at least one other data storage media card is controlled as a slave, without interfacing with a read/write unit separate from the storage media cards, and power required for operating at least one other data storage media card is provided by the data storage media card which controls the data interchange as a master.

13. The mobile data storage medium as claimed in claim 11, wherein no read/write unit is required for contactless data transmission between the data storage media card and the at least one other data storage media card.

* * * * *

UNITED STATES PATENT AND TRADEMARK OFFICE
CERTIFICATE OF CORRECTION

PATENT NO. : 7,150,407 B1 Page 1 of 1
APPLICATION NO. : 11/016374
DATED : December 19, 2006
INVENTOR(S) : Dominik Berger et al.

It is certified that error appears in the above-identified patent and that said Letters Patent is hereby corrected as shown below:

Claim 1, col. 4, line 25, "media" should read --media cards--;

Claim 2, col. 4, line 33, "card" should read --cards--(2 occurrences);

Claim 3, col. 4, line 35, "card" should read --cards--;

Claim 4, col. 4, line 37, "card" should read --cards--;

Claim 6, col. 4, line 45, "medium" should read --media card--;

Claim 11, col. 4, line 64, "medium" should read --media card--;

Claim 12, col. 4, line 66, "card" should read --cards--;

Claim 12, col. 4, line 67, "card" should read --cards--; and

Claim 13, col. 6, line 1, "medium" should read --media card--.

Signed and Sealed this

Twentieth Day of February, 2007

JON W. DUDAS
*Director of the United States Patent and Trademark Office*